United States Patent [19] [11] 4,331,893
Conners [45] May 25, 1982

[54] BOOLEAN LOGIC PROCESSOR WITHOUT ACCUMULATOR OUTPUT FEEDBACK

[75] Inventor: John P. Conners, Fond du Lac, Wis.

[73] Assignee: Giddings & Lewis, Inc., Fond du Lac, Wis.

[21] Appl. No.: 97,689

[22] Filed: Nov. 28, 1979

Related U.S. Application Data

[62] Division of Ser. No. 426,277, Sep. 24, 1976, Pat. No. 4,212,076.

[51] Int. Cl.³ .............................................. H03K 19/20
[52] U.S. Cl. .................................... 307/465; 307/445; 364/716
[58] Field of Search ........................ 307/207, 445, 465; 364/716

[56] References Cited

U.S. PATENT DOCUMENTS 3,145,342 8/1964 Hill ................................... 307/207 X
3,571,615 3/1971 Kelly ................................. 307/207
3,609,569 9/1971 Todd ............................. 307/207 X
4,056,736 11/1977 Blatt ............................. 307/207 X Primary Examiner—John S. Heyman
Attorney, Agent, or Firm—Leydig, Voit, Osann, Mayer & Holt, Ltd.

[57] ABSTRACT

A clocked digital Boolean processor which responds to operation code signals and to successive single bit input (operand) signals to drive a single bit accumulator to output the successive answers of chained Boolean operations. The hardware elements are configured such that no feedback of the accumulator output (the previous answer) is required because the logic circuits determine the setting or resetting of the accumulator regardless of what the previous answer was—and yet such that the new answer represents the result of a LOAD, AND, OR or EX-OR operation performed as if the input operand and the previous answer were taken as two operands.

6 Claims, 2 Drawing Figures

BOOLEAN LOGIC PROCESSOR WITHOUT ACCUMULATOR OUTPUT FEEDBACK

CROSS REFERENCES

This application is a division of U.S. application Ser. No. 726,277 (now U.S. Pat. No. 4,212,076) filed Sept. 24, 1976 under and with benefit of 35 U.S.C. 120, 121. That parent application and issued patent will hereinafter be called "the Parent Case". The drawings and specification of the Parent Case are here incorporated by reference to provide background of or essential material for the invention and to illustrate one environment in which the invention here claimed finds advantageous use.

SUMMARY OF THE INVENTION

The present invention relates in general to Boolean logic circuits and in particular to single bit Boolean logic processors. It pertains, moreover, to apparatus for signaling the latest result of a chain of successive Boolean operations where each operation creates the answer for a two input function, the two inputs being bi-valued and respectively representing (i) the previous answer arrived at in the chain and (ii) a new input treated as the operand in the next step of the chain.

The primary aim of the invention is to provide a single bit logic processor which eliminates totally the need for feedback of the accumulator answer.

A related object is to provide a simple, reliable and fast logic processor which avoids problems of propogation delays and time races by virtue of the fact that feedback is neither required nor used.

Another object is to provide a logic processor of the foregoing type which serves also, with the addition of only a few elements, as a bit manipulator—providing a bit control signal which may be used to drive a selected stored bit to agree with the accumulator answer or to be set, reset or inverted.

These and other objects and advantages will become apparent as the following description proceeds in conjunction with the accompanying drawings.

In the description which follows, reference will be made to Tables I and II (corresponding to Tables IV and VI in the Parent Case) which for convenience are located at the end of the specification.

DETAILED DESCRIPTION OF PREFERRED EMBODIMENT

A "one bit accumulating logic processor" is so named because in a functional sense it bears similarity to the known "arithmetic processors" employed in digital computers. Arithmetic processors, in general terms, include an algebraic adder circuit having two plural bits inputs which receive digital signals representing numerical operands M and N. The second operand, stored in and signaled by an accumulator, is fed back to one input of the adder. The first operand is signaled by an input register which is usually loaded from a particular memory location. Depending on the operation code (add, subtract, multiply, divide, etc.) and in some cases after plural steps or clock cycles, the adder signals the arithmetic result of operations such as $N+M$, $N-M$, $N \times M$, or $N \div M$—and that result appears in the accumulator so that it can be stored back in memory or used as the N operand in the next arithmetic procedure.

One bit logic processors likewise have an "accumulator". It is a bi-state device and signals a 0 or 1 output representing the result of some Boolean logic (rather than arithmetic) operation. There are, in effect, two bi-level operands U and V, the latter being the output of the accumulator and the former being brought in from some outside source. Depending on the operation code applied, the logic processor performs such functions as $U \rightarrow V$, $U \cdot V$, $U + V$, $U \oplus V$, that is "load accumulator with V", "make $V_{new}$ equal to U AND $V_{old}$", "make $V_{new}$ equal to U OR $V_{old}$", "make $V_{new}$ equal to U EXCLUSIVE OR $V_{old}$". Since the result of one logic operation becomes the new answer in the accumulator, successive or chained Boolean steps are carried out with different one bit signals brought in as the operand U.

As will be made clear below, the present invention brings to the art a logic processor which neither uses or requires feedback of one operand from the accumulator.

Figure 1:
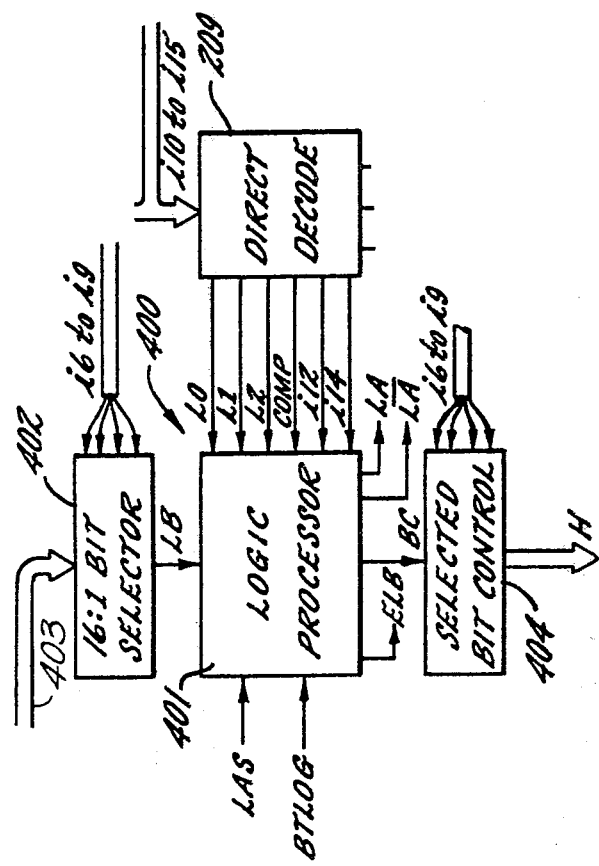
FIG. 1 is a block-and-line diagram (corresponding to a portion of FIG. 2a in the Parent Case) showing a logic processor according to a preferred embodiment of the present invention and the input, output and control signals associated with that embodiment.

FIG. 1 indicates that the logic processor 401 receives an incoming signal LB as its operand and produces an output signal LA from its accumulator (with the complement $\overline{LA}$ also being produced for convenience). The operation code signals L0, L1, L2 instruct the processor 401 as to the particular Boolean function which is to be performed. The signal COMP designates (when at a 0 or 1 level) whether the input LB is to be taken in its true form or treated as if it were complemented. When operated in logic processing mode, the enabling signal LAS is made high to permit clocking action; when operated in a bit manipulation mode an enabling signal BTLOG is made high to permit a bit control output signal BC to be effective, and control signals at i12 and i14 are created in various combinations and at different times as fully explained in the Parent Case. It will thus be unnecessary fully to repeat that explanation here, it being sufficient to note that the various operation codes are set out in Table II.

As a preliminary introduction, FIG. 1 illustrates a logic processor 401 which, in essence, performs two types of operations upon a single bit operand input signal LB. It "loads" the LB signal by making LA agree therewith, or it combines the LB signal by way of an AND, OR or XR (exclusive OR) function with the existing logic answer signal LA, changing the latter to agree with the result of that operation. Alternatively, it utilizes the operand input signal LB to create a bit control output signal BC which is utilized to drive the selected bit in the selected word to agree with the logic answer LA or to take on a specific desired one of the two possible binary values.

To instruct the logic processor 401 as to the particular operation which it is to perform, the direct decode circuit 209 is arranged to supply six input signals L0, L1, L2, COMP, i12, i14 to the processor. By the particular combination of these signals which exist, one particular logic function (out of eight specific possible logic functions) is commanded. The COMP signal instructs the processor as to whether the input signal LB is to be treated for logic processing in its true or its complement form. In the present specification the symbols "dot", +, ⊕ are used according to familiar Boolean algebra to denote the logic operators "and", "or", "exclusive or" ("x and y" is written x·y; "x or y" is written x+y; "x OR y" exclusively is written x⊕y). The other eight possible logic functions are listed in Table I wherein the neumonic symbols mean:

LD: Load selected bit into the logic accumulator to make LA agree therewith.

AN: Make $LA_n$ equal to $LA_0 \cdot LB$. (Note: $LA_0$ denotes the "old" value of LA; $LA_n$ denotes the "new" or resulting value of LA.)

OR: Make $LA_n$ equal to $LA_0 + LB$.

XR: Make $LA_n$ equal to $LA_0 \oplus LB$.

SV: Save (store) the LA signal at the selected bit location of the selected word.

IV: Store back into the selected bit location of the selected word the "inverted" (complement) form of the selected bit signal LB.

ST: Set the signal at the selected bit of the selected word to a binary 1 value.

RS: Reset the selected bit of the selected word to a binary 0 value.

Table IV will confirm that a five bit code (L0, L1, L2, i14, i12) uniquely represents, by the combination of binary values in those five signals, eight possible specific logic functions—so that operation code signals dictating the manner in which the logic processor 401 is to function are supplied to the processor from the direct decode circuit 209. The manner in which these operation code signals determine the specific operations of the logic processor will be explained later with reference to FIG. 2.

A 16:1 bit selector 402 pulls the LB signal from the selected bit location of an operand word which has been selected and fed into an arithmetic input register (not shown) so as to appear on a trunk 403. It does so by using the "bit identification" signals of a special instruction word as described in the parent case. Those four signals (appearing on output lines i6 to i9) represent in binary notation any decimal value from 0 to 15 and thus any bit place from b0 to b15. The bit selector 402 has sixteen input lines. When the decimal value of the i6 to i9 signals has a specific value within the range of 0 to 15, then the signal bit signal at its corresponding bit location b0 to b15 is transmitted to appear as the logic operand signal LB. For example, if the signals on lines i6 to i9 have the binary values 0101, then the signal from the bit location b5 of trunk 403 will be transmitted and appear as the single bit operand signal LB. If such i6 to i9 signals have the binary values 1011, the signal from the b11 location will become the signal LB. Such 16:1 multiplex circuits are per se well known and commercially available, so that a more detailed description is unnecessary.

To accomplish selective bit inversion in the execution of special logic instructions SV, IV, ST, RS, the signal BC is transmitted as the input to a selected bit control 404 which is a 1:16 demultiplexer gate selectively conditioned by the four place "bit" identification signals then on output lines i6 to i9. That is, the bit control circuit 404 is a known type of 1:16 MUX gate which receives the same control signals on lines i6 to i9 as the bit selector 402. It passes the signal BC (which, as noted below, the logic processor makes a "one" only when the selected bit of the selected word must be inverted) as a 0 signal on that one of its sixteen output lines (carrying the signal H) which corresponds to the selected bit location. All other output lines from the control 404 carrying the signal H remain at the 1 level.

As shown in FIG. 1 and noted above, the logic processor 401 receives a single bit input signal LB selected from a sixteen bit word) which can have either a 0 or a 1 value. It receives "operation function" signals L2, L1, L0, COMP, i12, i14 from the direct decode circuitry 209. And it produces output signals ELB, LA, $\overline{LA}$ and BC according to the function which it is commanded to perform, correctly modifying the signal LA as each successive operation within a Boolean chain of steps is performed.

Figure 2:
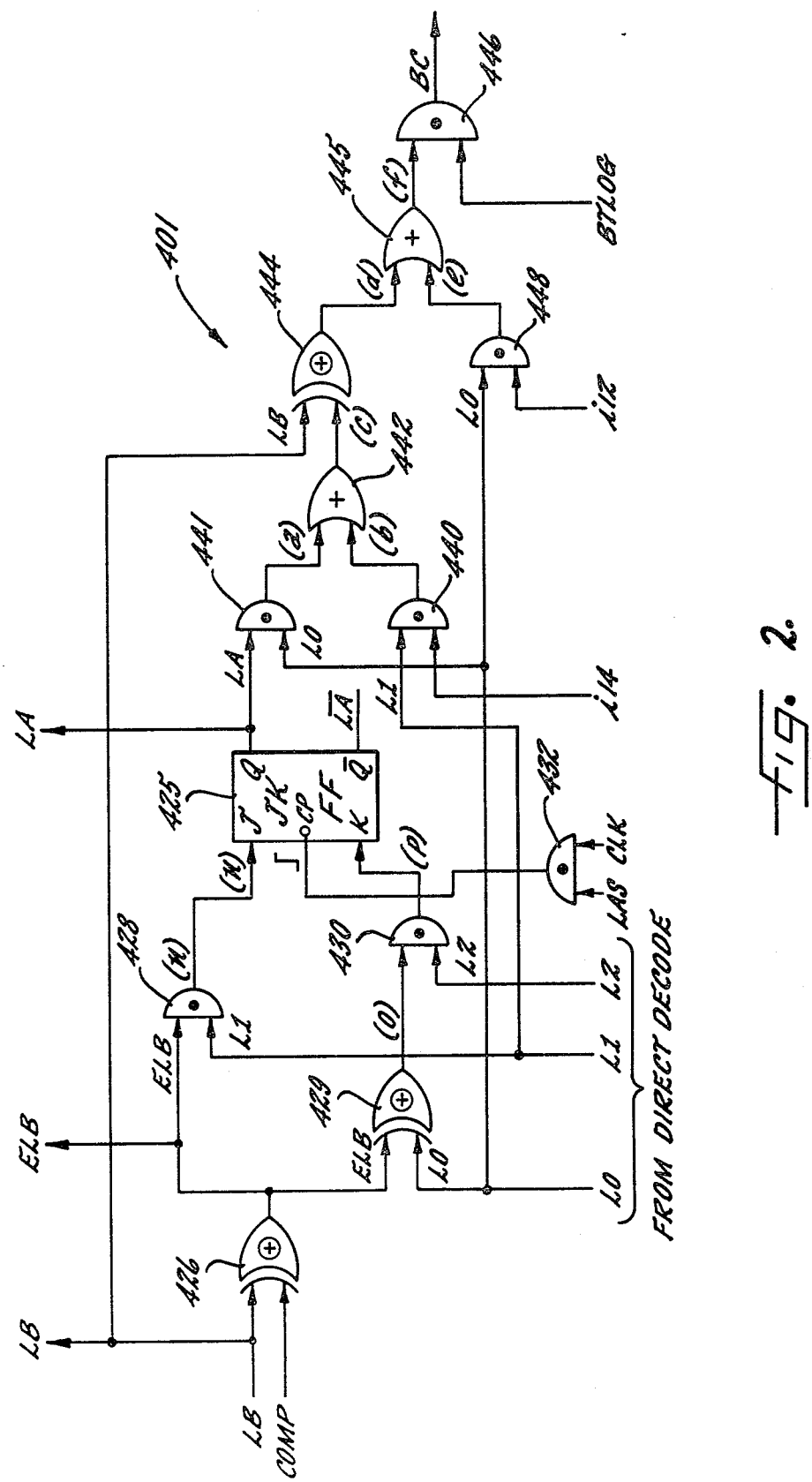
FIG. 2 is a logic circuit diagram (identical to Parent Case FIG. 10) illustrating the details of the logic processor which appears generally in FIG. 1.

While different specific circuits may be utilized, the details of one suitable logic processor 401 are shown in FIG. 2. They will be treated first with regard to chained Boolean logic operations and thereafter with regard to bit manipulation and storage.

A JK type flip-flop 425 in FIG. 2 is utilized as a single bit logic accumulator. It is choosen for the following characteristics: If a binary 1 level voltage is applied to its J or its K input, then the flip-flop is driven to (or left in) its set or reset state respectively in response to a positive-going voltage transition applied to its clock input CP; if neither of the input terminals J or K receives a 1 level control voltage, no response is made to a triggering signal on the clock input CP; but if a 1 level voltage is applied to both terminals J and K when the positive-going voltage transition is applied to input CP, then the flip-flop toggles or reverses from its existing state (set or reset) to its opposite state (reset or set). Of course, when in the set state the flip-flop 425 makes its output signals LA and $\overline{LA}$ respectively 1 and 0; when in the reset state, it makes LA and $\overline{LA}$ respectively 0 and 1.

Consider now the operation if the logic function code signals L2, L1, L0 are 111—corresponding to a "load accumulator" logic instruction LD (Table II). If the input signal LB is a 0 or 1 and the control signal COMP is 0, then the effective logic bit signal ELB produced by an exclusive OR circuit 426 will be 0 or 1. If ELB is 0, the output (n) of an AND circuit 428 will be 0, but the output (o) of an exclusive OR circuit 429 will be a 1 (recalling that L0 is a 1)—thus making the output (p) of AND circuit 430 a 1 and causing LA to be driven to (or left at) 0 when the flip-flop 425 is clocked. On the other hand, if ELB is a 1, signals (o) and (p) will be zero but the signal (n) will be 1—causing signal LA to be driven to (or left at) the 1 level when flip flop 425 is clocked. Thus, as indicated by the first line in Table II, an LD instruction causes the selected bit input signal LB to be "loaded" into the accumulator flip-flop 425 to make the logic answer signal LA agree therewith.

Of course, the exclusive OR circuit 426 causes ELB to be the complement of LB if, and only if, the signal COMP is a 1. Thus, if COMP is a 1, the apparatus of FIG. 2 acts as if the input signal LB is the inverse of its actual value.

Assume next that the logic instruction word calls for AN, so that the L2, L1, L0 code is 101. The signal LA in these circumstances is to be driven to (or left at) that level which is the answer of the logical AND function: $LA_n = LA_0 \cdot LB$. If the flip-flop 425 is already in the 1 state, LA does not have to be changed if LB is a 1. Only if LB is a 0 is it necessary to clock flip-flop 425 to the reset state. Since the signals at L0 and L2 are both one, the signals (o) and (p) will be a 1 or 0 if ELB is a 1 or a 0, respectively. Thus, flip-flop 425 will be reset (or left reset) by a clock pulse if ELB is zero. The end result is that the new value of LA will always be a 1 or 0 if the AND function $LA_0 \cdot LB$ (assuming COMP is zero) is or is not satisfied. This truism is reflected in the second line of Table II for the various conditions which may exist (LB being 1 or 0 and COMP being 1 or 0).

If the logic instruction is OR, so that the L2, L1, L0 function code is 010 (Table II), then signal $LA_0$ is to be kept so it becomes $LA_n$ if $LA_0$ is a 1. But if $LA_0$ is a 0, it is to be switched to a 1 only if ELB is a 1. The AND circuit 428 will be qualified to make signal (n) a 1 in the latter case. And in any case, AND circuit 430 will be disqualified so flip-flop 425 cannot be reset. Clearly, therefore, when the OR function code is received, and the flip-flop 425 is clocked, LA will stay at a 1 level if it previously existed at that level; and LA will be switched from 0 to 1 if the signal ELB is a 1. This fulfills the logical OR function such that $LA_n = LA_0 + LB$, as indicated by the third line in Table II.

If the logic instruction is XOR, and the L2, L1, L0 code 110 (Table II), then the signal LA is to be converted to a 0 or a 1 if it previously was a 1 or a 0 and the input signal ELB is a 1. As here shown, if the signal ELB is 1, signal (n) is a 1 and signals (o) and (p) are 1's so that a pulse on CP toggles flip-flop 425. If ELB is a 0, then both (n) and (p) are 0 and the flip-flop 425 does not respond to a clock input. In consequence, whenever the instruction XOR is received and decoded to make L2, L1, L0 take on values 110, the apparatus of FIG. 2 responds to a clock pulse so as to make certain that $LA_n = LA_0 \oplus LB$, where the symbol $\oplus$ represents the exclusive OR function.

As indicated by Table II and the foregoing description, the logic processor of FIG. 2 takes a single input signal LB and converts it into an effective logic bit signal ELB which is identical to LB or the inverted form thereof if the signal COMP is a 0 or a 1. This operation is performed by the exclusive OR circuit 426. In response to the signal ELB, the apparatus produces a new logic answer signal LA which is the result of the logic function commanded by coded signals L2, L1, L0 (the codes of these signals corresponding to instructions LD, AN, OR, XOR). To "clock" the logic processing circuitry for successive operations, an AND circuit 432 receives the "store" signal LAS (from the field decoder FD5 and the timing signal CLK described in Parent Case) after the signal LB has been created and the proper voltage levels established at the flip-flop control terminals J and K. Those control signals result from the single input signal LB which is created by and causing the bit selector circuit 402 to feed the selected bit (responsive to bit selection signals on lines i6 to i9) as the input signal LB to the logic processor.

From Table II and FIG. 2 it will be seen that the 3-place function code signals L2, L1, L0 and the input signal LB act as inputs to (1) means (formed by 428, 429, 430) responsive solely to "load" function code signals (1, 1, 1) and the input signal LB for applying to terminal J or K a 1 level when LB is respectively at a 1 or 0 level;
(2) means (formed by 428, 429, 430) responsive solely to "and" function code signals (1, 0, 1) the input signal LB for applying to the K terminal a 1 level signal only when LB is at a 0 level;
(3) means (formed by 428, 429, 430) responsive solely to "or" function code signals (0, 1, 0) for applying to the J terminal a 1 level only when LB is at a 1 level, and
(4) means (formed by 428, 429, 430) responsive solely to "exclusive OR" function code signals (1, 1, 0) for applying to both the J and K terminals a 1 level only when LB is at a 1 level,—such means placing 0 level voltages on the J and K terminals except in the cases specified. Therefore, the logic processor 401 functions completely without feedback of its output signal LA and the latter does not effect the operation of the means (1) through (4). After the operation code signals and the input signal LB are present in any of their various 0 or 1 level combinations (Table II), the clock pulse applied from AND circuit 432 to terminal CP simply triggers (or leaves untriggered) the flip-flop 425 to make LA take on (or keep) the bistate value which is the correct result of the function represented by the coded operation signals—as shown in the right column of Table II. Of course, the signal ELB is the same as LB if the true/complement signal COMP is 0; and is the complement of LB if COMP is 1—so that LB is selectively treated in its true or complement sense.

The novel processor shown in FIG. 2 is advantageous because it requires no feedback and is easily "instructed" by three-place function code signals.

One may appreciate that if a Boolean chain of operations is to be performed according to a simple, exemplary expression such as:

$$X = (N1 + \overline{N2}) \cdot N3 \oplus N4$$

where

N1 is the tenth bit b9 of memory word 44,
N2 is the eighth bit b7 of memory word 25,
N3 is the first bit b0 of memory word 61, and
N4 is the fifteenth bit b14 of memory word 35, then it is possible to write program steps in machine language as follows:

|  | LD | T | b10 | addr. 44 |
|---|---|---|---|---|
| Step 1 | 01011 | 0 | 1010 | 101100 |
| After execution, LA = N1 |
|  | OR | C | b8 | addr. 25 |
| Step 2 | 01111 | 1 | 0100 | 011001 |
| After execution, LA = N1 + $\overline{N2}$ |
|  | AN | T | b0 | addr. 61 |
| Step 3 | 01001 | 0 | 0000 | 111101 |
| After execution, LA = (N1 + $\overline{N2}$) · N3 |
|  | XR | T | b14 | addr. 35 |
| Step 4 | 01101 | 0 | 1110 | 100011 |
| After execution, LA = (N1 + $\overline{N2}$) · N3 $\oplus$ N4 |

Those elements identified at 440, 441, 442, 444, 445, 446 and 448 in FIG. 2 participate in the "bit manipulation" functions described as "save", "set", "reset" and "invert" (designated by symbols SV, ST, RS and IV) in the Parent Case. Since these elements form no part of the Boolean logic processor claimed as the invention in this divisional case, the reader is preferred to the Parent Case if he wishes to understand their purposes and functions. They are included in FIG. 2 only for the sake of completeness and to show that the novel logic processor may readily be associated with additional elements which perform bit manipulation operations.

The logic processor of FIG. 2 is notable for the fact that, in the preferred embodiment, for example, it requires only a J-K flip-flop or its equivalent plus four logic gates 428, 429, 430, 432—and it is controlled by only three operation code signals L0, L1, L2. The exclusive OR gate 426 and the true/complement treatment of the LB signal is optional. Indeed, the gate 432 may also be omitted if the processor is to operate on every cycle (pulse) of the clock signal CLK, the gate and the signal LAS being used, in effect, to turn off the processor and freeze the value of the output signal LA.

Despite such simplicity, the present logic processor requires and uses no feedback of the signal LA; it produces chained Boolean operations in sequence as if the signal LA were participating as one operand but the absence of feedback permits it to be clocked at very high rates without worry that propagation delays will cause malfunction.

Tables I and II, to which reference has been made, follow as the concluding portion of this specification.

TABLE I

Instruction Direct Decoder Truth Table

| | INPUT | | | | OUTPUT | | | |
|---|---|---|---|---|---|---|---|---|
| INSTR. | i15 | i14 | i13 | i12 | L2 | L1 | L0 | i14 | i12 |
| LD | 0 | 1 | 0 | 1 | 1 | 1 | 1 | | |
| AN | 0 | 1 | 0 | 0 | 1 | 0 | 1 | | |
| OR | 0 | 1 | 1 | 1 | 0 | 1 | 0 | | |
| XR | 0 | 1 | 1 | 0 | 1 | 1 | 0 | | |
| SV | 1 | 0 | 0 | 0 | | 0 | 1 | | 0 |
| IV | 1 | 0 | 0 | 1 | | 0 | 1 | | 1 |
| ST | 1 | 1 | 0 | 1 | | 1 | 0 | 1 | |
| RS | 1 | 0 | 1 | 1 | | 1 | 0 | 0 | |

Bit signal i11 becomes signal GETOP

TABLE II

Logic Processor Operation

| INSTRUCTION | Function Code | | | LB | T/C | ELB | (n) | (o) | (p) | LA new after clocking | |
|---|---|---|---|---|---|---|---|---|---|---|---|
| | L2 | L1 | L0 | | | | | | | | |
| LD | 1 | 1 | 1 | 0 | 1 | 0 | 1 | 0 | 0 | 1 | 1 | 0 |
| | | | | 0 | 1 | 1 | 0 | 1 | 1 | 0 | 0 | 1 | $LA_{new} = ELB$ |
| | | | | 0 | 1 | 0 | 1 | 0 | | 1 | 1 | 0 |
| AN | 1 | 0 | 1 | | | | 0 | | | | | |
| | | | | 0 | 1 | 1 | 0 | 1 | | 0 | 0 | 1 | $LA_{new} = LA_0 \cdot ELB$ |
| | | | | 0 | 1 | 0 | 1 | 0 | 0 | 0 | | 0 |
| OR | 0 | 1 | 0 | | | | | | | 0 | | $LA_{new} = LA_0 + ELB$ |
| | | | | 0 | 1 | 1 | 0 | 1 | 1 | 1 | | 1 |
| | | | | 0 | 1 | 0 | 1 | 0 | 0 | 0 | | 1 |
| XR | 1 | 1 | 0 | | | | | | | | | $LA_{new} = LA_0 \oplus ELB$ |
| | | | | 0 | 1 | 1 | 0 | 1 | 1 | 1 | | 0 |

Bit Storage and Manipulation Operation

| INSTRUCTION | Function Code | | LB | LA | i14 | i12 | (a) | (b) | (c) | (d) | (e) | (f) | BC when strobed |
|---|---|---|---|---|---|---|---|---|---|---|---|---|---|
| | L1 | L0 | | | | | | | | | | | |
| SV | 0 | 1 | 0 | 1 | 0 | 0 | | 0 | 0 | 0 | 0 | 0 | 1 | 0 | 1 | 0 | 1 |
| | | | 0 | 1 | 1 | 1 | — | 0 | 1 | 1 | 1 | 1 | 1 | 0 | 1 | 0 | 1 | 0 |
| IV | 0 | 1 | — | — | — | 1 | — | 0 | — | — | 1 | 1 | 1 |
| ST | 1 | 0 | 0 | — | 1 | — | 0 | 1 | 1 | 1 | 0 | 1 | 1 |
| | | | 1 | | | | | | | | 0 | | 0 | 0 |
| RS | 1 | 0 | 0 | — | 0 | — | 0 | 0 | 0 | 0 | 0 | 0 | 0 |
| | | | 1 | | | | | | | | | 1 | 1 | 1 |

I claim:

1. A clocked accumulating logic processor without feedback and responsive to a single bit input signal (LB) for converting a single bit logic answer signal (LA) to the result of a "load", "and", "or" or "exclusive or" operation represented by function code signals, said processor comprising, in combination:

(a) a JK type flip-flop having J and K control terminals, a clock input CP, and having an output terminal Q upon which the answer signal LA appears, (b) means responsive solely to "load" function code signals and said input signal (LB) for applying to said J or K terminals a 1 level signal when the input signal (LB) is respectively at a 1 or 0 level, (c) means responsive solely to "and" function code signals and said input signal (LB) for applying to said K terminal a 1 level signal only when the input signal (LB) is at a 0 level, (d) means responsive solely to "or" function code signals and said input signal (LB) for applying to said J terminal a 1 level signal only when the input signal (LB) is at a 1 level, (e) means responsive solely to "exclusive or" function code signals and said input signal (LB) for applying to both said J and K terminals a 1 level signal only when said input signal (LB) is at a 1 level, said means (b)-(e) including means for applying 0 level signals to said J and K terminals except in the cases specified above, and (f) means for applying a pulse to said clock input after any of said means (b)-(e) has applied the respectively specified 1 level signals, whereby said answer signal (IA) takes on a new bistate value $LA_n$ respectively according to the Boolean functions $LA_n = LB$, $LA_n = LA_o \cdot LB$, $LA_n = LA_o + LB$, or $LA_n = LA_o \oplus LB$ despite the fact that said signal $LA_o$ does not participate in the operation of said means (b)-(e).

2. The combination set forth in claim 1 further including means for selectively inverting said input signal (LB) before its application to said means (b)-(e) so that the processor responds to the input signal taken in its true or complement form.

3. The combination set forth in claim 1 wherein said means (b) through (e) include (g) means for applying to said J terminal a 1 level signal whenever (i) said input signal is at a 1 level and (ii) the operation code signals designate a "load", "or" or "exclusive or" function, (h) means for applying to said K terminal a 1 level signal whenever (i) said input signal is at a 1 level and the operation code signals designate an "exclusive or" function, or (ii) said input signal is at a 0 level and said operation code signals designate a "load" or "and" function.

4. The combination set forth in claim 3 wherein (g') said means (g) comprises a first AND gate receiving said input signal (LB) and is enabled by any operation code signals except those designating an "and" function, and (h') said means (h) comprises an XOR gate coupled to receive said input signal (LB) and an "enable invert" signal from code signals representing a "load" or "and" function, together with a second AND gate receiving the output of said XOR gate and enabled by any operation code signals except those designating an "or" function, the outputs of said first and second AND gates being connected to said J and K terminals, respectively.

5. The combination set forth in claim 4 further characterized in that said operation code signals comprise three bistate signals L2, L1, L0 and are coded to designate "load" as 1, 1, 1; "and" as 1, 0, 1; "or" as 0, 1, 0 and "exclusive or" as 1, 1, 0;—and wherein the signal L1 is applied as an input to said first AND gate, the signal L0 is applied to said XOR gate, and the signal L2 is applied to said second AND gate.

6. A clocked accumulating logic processor without feedback and responsive to a single bistate input signal (LB) for converting a single bistate answer signal (LA) to the result of a "load," "and", "or" or "exclusive or" operation represented by function code signals, said processor comprising, in combination:

(a) a JK type flip-flop having J and K control terminals, a clock input, an output terminal Q upon which the answer signal LA appears, (b) means for applying to said J terminal a 1 level signal only when
(i) said input signal (LB) is at a 1 level and said function code signals designate any operation except "and", (c) means for applying to said K terminal a 1 level signal only when
(i) said input signal is at a 0 level and said function code signals designate a "load" or an "and" operation, and
(ii) said input signal is at a 1 level and said function code signals designate an "exclusive or" operation, and (d) means for applying a clock pulse to said clock input after any function code signals and the input signal (LB) have been applied to said means (b) and (c), whereby said answer signal (LA) takes on a new value $LA_n$ respectively according to the Boolean function $LA_n=LB$ for "load," $LA_n=LA_o \cdot LB$ for "and", $LA_n=LA+LB$ for "or" and $LA_n=LA_o \oplus LB$ despite the fact that the answer signal is not applied to and does not affect the operation of said means (b) and (c).

* * * * *